Patented May 14, 1940

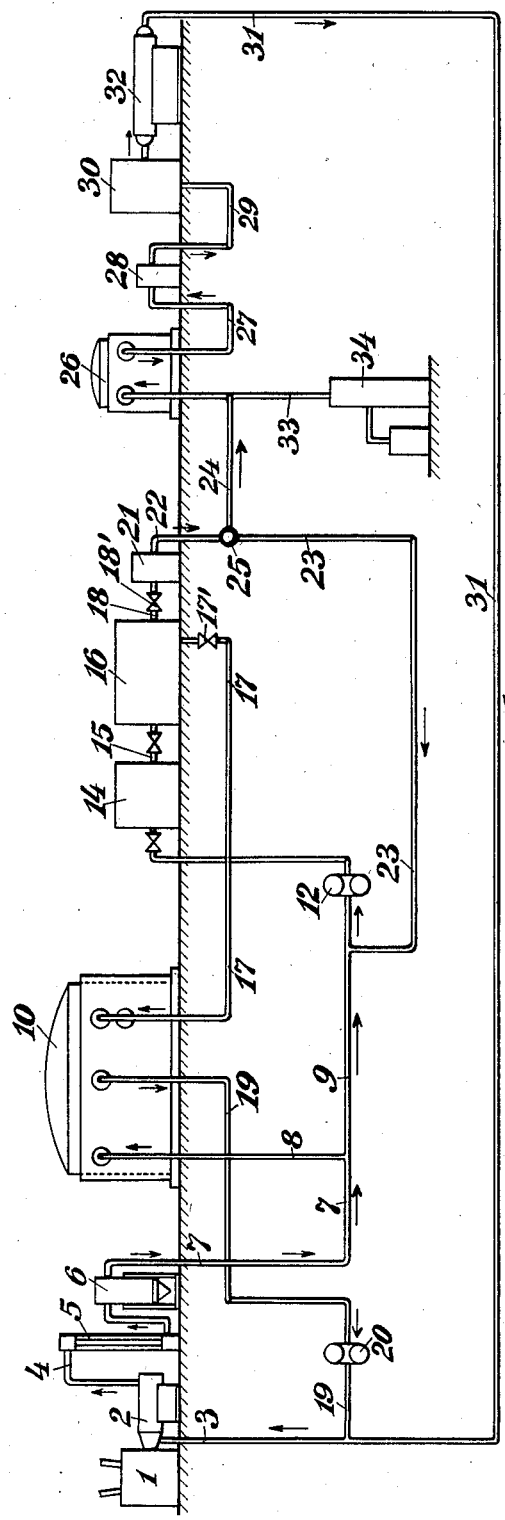

2,200,772

UNITED STATES PATENT OFFICE 2,200,772

PROCESS OF PRODUCING METALLIC MAGNESIUM

Konrad Erdmann, Radenthein, Germany, assignor to American Magnesium Metals Corporation, Pittsburgh, Pa.

Application April 27, 1939, Serial No. 270,330
In Germany May 12, 1938

8 Claims. (Cl. 75—67)

Up to a few years ago magnesium was exclusively prepared by electro-chemical methods, large scale production making no use of purely thermal methods.

As far as, more particularly, the reduction of magnesium oxide with carbon according to the equation MgO+C=Mg+CO is concerned, in spite of frequent attempts at solving the problem, this has failed until recently due to the fact that the magnesium vapours formed are over a large temperature range converted back into magnesium oxide by the simultaneously produced carbon monoxide on the temperature falling below the reduction temperature. This difficulty could be effectively overcome only by a process of United States Patent No. 1,884,993 the essence of which consists in this that the vaporous and gaseous reaction products until leaving the reduction space are maintained at a temperature at which the equilibrium of the reversible reaction lies on the side of magnesium metal formation, and only on exit from the reaction space or chamber are diluted and simultaneously suddenly cooled down to a temperature advantageously lying far below the solidification point of magnesium by a supply of large quantities of hydrogen (or some other gas inert to magnesium). Thus the condensate deposits in the form of dust. From the cooling gas issuing from the condenser, after separating off the magnesium dust, carbon monoxide is removed and the cooling gas used again in circulation.

Since the sufficiently rapid cooling requires very considerable quantities of cooling gas (50–70 cu. m. per kg. of magnesium) the treatment costs are of very substantial importance for the economy of the process.

With the view of reducing these costs as far as possible, it is the main object of the present invention to provide an improved cyclic method for producing metallic magnesium in accordance with the process of United States Patent No. 1,884,993.

Another object of the invention is to provide a simple and inexpensive method for purifying the recirculated cooling gas the purifying effect of which is not impaired but even enhanced in spite of the economical management of the method.

In the process according to the present invention, from the gas mixture escaping from the condenser, after separation of the magnesium dust formed through the reduction of the magnesium containing prime material with the aid of a carbonaceous reducing agent, carbon monoxide is removed by selective adsorption on activated carbon at low temperature in an amount corresponding to the increment due to the carbon monoxide formation in the reduction stage, and the thus purified mixture is thereupon used again in a circuit for diluting and at the same time chilling the gaseous reaction products at the point of their exit from the reduction chamber. The adsorption by activated carbon cannot serve for complete or almost complete separation of hydrogen and carbon monoxide since the adsorption constants of the two gases with respect to activated carbon lie too close together even at low working temperatures, I have found, however, that within the scope of the present invention, in which it is only intended to remove so much carbon monoxide from the mixture as corresponds to the increase due to the carbon monoxide formation in the reduction stage, the said method of adsorption is not only feasible but has special advantages.

By means of the present invention, which in the first instance gives improved economy, the treated gas mixture is at the same time freed from other impurities. Such other impurities it is true are present only in small or in very small amounts, but the presence of them in the cooling gas very unfavourably affects the condensation. By leading hydrogen treated in this manner back into the cooling gas circuit, the reversal of the reaction in the condensation stage, under conditions otherwise identical, is much more effectively prevented than for example in the case of the purification of the gas mixture by water gas oxidation, which advance is demonstrated by the fact that the metallic magnesium content of the condensate rises to a surprising extent.

In order to ensure that the fraction of the gas which passes unabsorbed through the activated carbon is sufficiently freed from carbon monoxide at the most economical reduced temperature, it is advisable to interrupt the charging of the adsorption agent long before the point of adsorption equilibrium has been reached. As long as the carbon is still fully capable of absorbing, the hydrogen streaming out contains only small quantities of CO; with increasing saturation the carbon monoxide content curve rises steeply until the point of saturation is reached. Thus, everything points to the desirability of making the duration of the charging periods as short as possible. The adsorbate can with suitable pressure reduction or sub-atmospheric pressure be completely removed in a few minutes, even if only two adsorption chambers are provided for the alternating charge and discharge periods.

The period of alternation may therefore be of the order of a few minutes.

After switching off the vacuum pump, the activated carbon is ready for absorbing the next charge without any special reactivation being necessary; it is sufficient if the adsorbent is freed from time to time, by slightly heating the said adsorbent (e. g. to 70° C.), from retained substances which are solid at the working temperature and do not possess a sufficiently high vapour pressure to be removed by sub-atmospheric pressure (e. g. water). It is therefore of advantage to operate with three adsorption chambers of which at least one is provided with devices for heating and cooling down.

The process is rendered still more economical by the fact that in the case of rapid alternation of the charging and discharging periods the quantity of adsorption agent may be so small that it amounts to only a fraction of the quantities generally used. Furthermore, owing to the low stress put on the active carbon its life is almost unlimited.

If the adsorbate is expelled by pressure reduction, a hydrogen fraction with a high carbon monoxide content is obtained which can be dealt with in any any desired manner. If the hydrogen bound by the adsorption agent is not led back into the circuit, then the corresponding quantity of fresh hydrogen must be supplied thereto.

Advantageously, however, the expelled gas mixture is subjected to an after-treatment by known chemical or physical methods for separating the carbon monoxide from hydrogen with or without recovery of CO. This also permits of the hydrogen residue being passed back into circulation. For this purpose a suitable part of the described gas mixture is brought to the desired residual content of carbon monoxide, e. g. by the water gas oxidation; the excess suffices to yield the necessary quantities of steam for this conversion by combustion.

If this replenishing expedient is made use of, effecting the pressure diminution in two or several stages and separately collecting the desorbate thereby liberated, such as is known per se, then a fraction comparatively poor in carbon monoxide can be separated off to a certain extent as a preliminary before the portions rich in carbon monoxide are released. This preliminary fraction is advantageously led back into the input mixture before this enters the adsorption chamber.

According to a preferred embodiment of the invention, the gas mixture leaving the condenser is divided into two fractions of which the one, preferably the smaller, is separated off unchanged, whereas the second is subjected to treatment by means of activated carbon, and the two portions are then united in order that the gas mixture may be used again in the circuit.

In carrying the invention into effect according to one example, it is assumed that 13,200 cu. m. of gas mixture having a composition of 96.14% hydrogen and 3.86% carbon monoxide, are hourly returned into the circuit and that in the reduction stage there is an hourly increment of 155 cu. m. of 100% carbon monoxide, the quantity of gas issuing from the condenser rising to 13,355 cu. m. per hour and the carbon monoxide content to 4.95%. Of this gas mixture 3,685 cu. m. per hour are separated off unchanged, whilst 9,670 cu. m. per hour flow through the adsorption chambers charged with activated carbon.

By pressure reduction down to 100 mm. a preliminary fraction amounting to 330 cu. m. per hour with a carbon monoxide content of 6% are expelled from the adsorbate. This preliminary fraction is united with the portion of 9,670 cu. m. of the crude mixture which is to be purified by adsorption by activated carbon, before entering the adsorption chambers, as a result of which this portion increase to 10,000 cu. m. per hour. This whole quantity is now cooled down to −50° C. and led over the activated carbon preliminarily cooled to the same temperature, whereby 9,340 cu. m. of unabsorbed gas mixture issue, the carbon monoxide content of which has sunk to 3.45%. By further pressure reduction down to about 10 mm., 330 cu. m. per hour of a fraction containing 47% carbon monoxide are liberated from the adsorbate. Of this portion 115 cu. m. per hour are burnt for the production of steam, with the aid of which the remainder is converted into 200 cu. m. per hour of hydrogen containing 3% carbon monoxide.

The unchanged separated-off portion of the gas mixture streaming out of the condenser amouting to 3,685 cu. m. per hour with a content of 4.95% CO is mixed with the 9,340 cu. m. which hourly issue from the adsorption chamber with a content of 3.45% CO.

With a mechanical loss of 25 cu. m. per hour a return of 13,000 cu. m. of hydrogen with 3.88% CO is obtained which with the 200 cu. m. in which the carbon monoxide content is reduced to 3% in each hour by the water gas oxidation, yields the 13,200 cu. m. with 3.86% CO which are hourly supplied to the condenser as cooling gas. In round figures the carbon monoxide scheme is as follows:

|  | m.³/h. |
|---|---|
| Increase of CO | 13,200 . 3.86=510<br>155         =155<br>———<br>665 |
| Unchanged fraction | 3,685 . 4.95=182 |
| Exit gas from activated carbon | 9,340 . 3.45=322 |
| Converted desorbate gas | 200 . 3    =    6<br>———<br>510 |

665−510=155

One form of apparatus suitable for carrying out the process will now be described with reference to the accompanying drawing.

In the arrangement illustrated, an electric furnace 1 is provided in which the reduction takes place, and in the exit opening of the furnace a condenser 2 is arranged into which latter passes the mixture of magnesium vapours and gases, more particularly carbon monoxide, produced in the reduction chamber. The cooling gas is blown in through a pipe 3 for the purpose of diluting and condensing the magnesium vapours to dust. The mixture of cooling gas with magnesium dust and the gaseous reaction products then passes through a pipe 4 into a cooler 5 and thereafter into a filter 6, where the magnesium dust is separated off whilst the gases pass on through a pipe 7 which forks into two pipes 8, 9. Pipe 8 supplies a relatively small portion of the gas mixture to a gasometer 10, whilst pipe 9 conducts the greater part of the mixture through a blower 12 into a low temperature cooler 14. The proportion of gas quantities drawn off through pipes 8 and 9 is regulated by suitable dimensioning of the pipe cross sections. The low temperature cooler 14 is connected by means of a pipe 15 to an adsorption chamber 16 containing activated carbon. At least two adsorption chambers are provided which are set alternately into operation, but preferably there are three, one of which at least is fitted with devices for heating and cooling. From each of the adjacent adsorption chambers 16 branch off two pipes 17 and 18. The pipe 17 leads back to the gasometer 10 from which the collected gas is sucked off through a pipe 19 from a blower 20 and forced through the pipe 3 to the condenser 2. The other pipe 18 leads to the suction side of a pump 21; to the pressure side of the pump is connected a pipe 22, common to all the adsorption chambers, which forks into pipes 23 and 24. At the forking point there is a two-way valve 25. The pipe 23 joins the pipe 9 at a point which is in front of the blower 12 in the direction of flow. The pipe 24 leads to a gasometer 26 from which a compressor 28 sucks the collected gas through a pipe 27 and passes it through a pipe 29 into a converting plant 30. A pressure vessel 32 is included in a lead-off pipe 31 of the converting plant. A pipe 33 to a generator 34 branches off from the pipe to the gasometer 26.

In operation the mixture of vapours and gaseous reaction products is sucked by the blower 12 out of the condenser 2 through the cooler 5 and the filter 6. In the filter 6 the magnesium dust contained in the mixture is deposited. Of the gas mixture streaming off through the pipe 7, part passes through the pipe 8 to the gasometer 10, the remainder goes into the low temperature cooler 14 where the mixture is cooled for example to —50° C. From here the mixture passes into the adsorption chamber 16, in which the charge is preliminarily cooled to —50° C. by means of a cooling device.

During this operation a valve 17' in the pipe 17 is open whilst a valve 18' of the pipe 18 is closed, so that the mixture of carbon monoxide and hydrogen issuing unabsorbed can flow through the pipe 17 to the gasometer 10. The stream of mixture is now led into the second adsorption chamber and the first chamber is connected with the pump 21 by closing valve 17' and opening valve 18' for the purpose of evacuating the same.

Down to the attainment of a certain sub-atmospheric pressure (e. g. 100 mm.) a mixture is sucked off the CO content of which is approximately the same as that of the mixture issuing from the condenser. This preliminarily withdrawn fraction is led back into the pipe 9 through the pipe 23 after the pipe 24 to the converting plant has been closed off by means of the two-way valve 25. The pipe 24 is thereupon made accessible to the gas stream by turning the valve 25 and the pressure is continuously further diminished until it has reached a value of for example 10 mm. As a result a gas mixture is driven out containing round about 50% CO. This mixture passes through the pipe 24 into the gasometer 26 from which it is forwarded into the converting plant 30 through the compressor 28, in which plant the carbon monoxide is removed by water gas oxidation down to a residual content of 3%. After washing out the carbonic acid the purified gas is drawn out of the pressure vessel 32 through the pipe 31 to the pipe 3, to which on the other hand the gas mixture collected in gasometer 10 is supplied by means of the blower 20.

In order to set the plant into operation, water gas is produced in the generator 34 and after the removal of the CO down to the attainable residual content is blown out of the converting plant through the pipes 31 and 3 directly into the condenser 2.

What I claim is:

1. A process of producing metallic magnesium, which comprises evolving magnesium vapor from magnesium-containing prime material by thermal reduction with the aid of a carbonaceous matter and diluting and suddenly chilling, by a supply of large quantities of hydrogen, the disengaged vapors at the point of their exit from the reduction chamber so as to condense magnesium in powdery form, separating off the powdery condensate from the accompanying gas mixture, removing from the escaping gas mixture, by selective adsorption on activated carbon at low temperature, an amount of carbon monoxide corresponding to the increment due to the carbon monoxide formation in the reduction stage, and then using the purified gas mixture again in a circuit as diluting and cooling gas.

2. In the process as defined in claim 1 the step consisting in dividing into two portions the gas mixture left behind after removal of the powdery condensate, of which a smaller one is detached in an unchanged condition, whereas the second portion is subjected to a treatment by activated carbon at low temperature to reduce the carbon monoxide content thereof by selective adsorption, and then uniting those two fractions to lead back the gas mixture obtained into the circuit.

3. A process of producing metallic magnesium, which comprises evolving magnesium vapor from magnesium-containing prime material by thermal reduction with the aid of a carbonaceous matter and diluting and suddenly chilling, by a supply of large quantities of hydrogen, the disengaged vapors at the point of their exit from the reduction chamber so as to condense magnesium in solid powdery form, removing the powdery condensate from the accompanying gas mixture, separating the escaping gas mixture, with the aid of preferential adsorption on activated carbon at low temperature, into fractions enriched with hydrogen passing unabsorbed through the adsorption material, which are re-used as diluting and cooling gas, and an adsorbate enriched with carbon monoxide which is then released.

4. A process as defined in claim 3 in which the steps of adsorption to produce a fraction enriched with hydrogen and of desorption to release the adsorbate enriched with carbon monoxide are alternated in periods of the order of a few minutes.

5. A process of producing metallic magnesium, which comprises evolving magnesium vapor from magnesium-containing prime material by thermal reduction with the aid of a carbonaceous matter and diluting and suddenly chilling, by a supply of large quantities of hydrogen, the disengaged vapors at the point of their exit from the reduction chamber so as to condense magnesium in solid powdery form, removing the powdery condensate from the accompanying gas mixture, separating the escaping gas mixture, with the aid of preferential adsorption on activated carbon at low temperature, into fractions enriched with hydrogen passing unabsorbed through the adsorption material, which are re-used as diluting and cooling gas, and an adsorbate enriched with carbon monoxide which is then released and subjected to an after-treatment for separating carbon monoxide from hydrogen.

6. A process of producing metallic magnesium, which comprises evolving magnesium vapor from magnesium-containing prime material by thermal reduction with the aid of a carbonaceous matter and diluting and suddenly chilling, by a supply of large quantities of hydrogen, the disengaged vapors at the point of their exit from the reduction chamber so as to condense magnesium in solid powdery form, removing the powdery condensate from the accompanying gas mixture, separating the escaping gas mixture, with the aid of preferential adsorption on activated carbon at low temperature, into fractions enriched with hydrogen passing unabsorbed through the adsorption material, which are re-used as diluting and cooling gas, and an adsorbate enriched with carbon monoxide which is then released and subjected to an after-treatment for separating carbon monoxide from hydrogen, with recovery of the carbon monoxide.

7. A process of producing metallic magnesium, which comprises evolving magnesium vapor from magnesium-containing prime material by thermal reduction with the aid of a carbonaceous matter and diluting and suddenly chilling, by a supply of large quantities of hydrogen, the disengaged vapors at the point of their exit from the reduction chamber so as to condense magnesium in solid powdery form, removing the powdery condensate from the accompanying gas mixture, separating the escaping gas mixture, with the aid of preferential adsorption on activated carbon at low temperature, into fractions enriched with hydrogen passing unabsorbed through the adsorption material, which are re-used as diluting and cooling gas, and an adsorbate enriched with carbon monoxide which is then released and subjected to an after-treatment for removing carbon monoxide therefrom, whereupon the thus purified gas is also led back into the circuit.

8. A process of producing metallic magnesium, which comprises evolving magnesium vapor from magnesium-containing material by thermal reduction with the aid of a carbonaceous matter and diluting and suddenly chilling, by a supply of large quantities of hydrogen, the disengaged vapors at the point of their exit from the reduction chamber so as to condense magnesium in solid powdery form, and then removing the powdery condensate from the accompanying gas mixture, separating the escaping gas mixture, with the aid of preferential adsorption on activated carbon at low temperature, into fractions enriched with hydrogen passing unabsorbed through the adsorption material, which are re-used as diluting and cooling gas, and an adsorbate enriched with carbon monoxide which is released, separately collected and divided into two portions, a larger one which is brought by water gas oxidation to a residual content of carbon monoxide enabling the purified gas mixture to be re-introduced into the circuit, and a smaller one which is used to yield, by combustion, the necessary quantities of steam for this conversion.

KONRAD ERDMANN.

CERTIFICATE OF CORRECTION.

Patent No. 2,200,772. May 14, 1940.

KONRAD ERDMANN.

It is hereby certified that error appears in the printed specification of the above numbered patent requiring correction as follows: Page 2, first column, line 39, for the word "described" read --desorbed--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.